(12) United States Patent
Chu (10) Patent No.: US 6,786,547 B1
(45) Date of Patent: Sep. 7, 2004

(54) CAR HEADREST COVER FOR PROTECTING AND BEAUTIFYING HEADREST

(75) Inventor: Fa-Yu Chu, Sanchong (TW)

(73) Assignee: Asiasonic International Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 10/613,111

(22) Filed: Jul. 7, 2003

(51) Int. Cl.[7] .................................................. B60N 2/60
(52) U.S. Cl. .................................... 297/220; 297/217.3
(58) Field of Search ............................. 297/219.1, 220, 297/228.1, 217.3, 188.06

(56) References Cited

U.S. PATENT DOCUMENTS

| | | | | | |
|---|---|---|---|---|---|
| 3,654,059 | A | * | 4/1972 | Zisblatt | 297/220 |
| 4,681,366 | A | * | 7/1987 | Lobanoff | 297/188.06 |
| 5,507,556 | A | * | 4/1996 | Dixon | 297/217.3 |
| 5,640,297 | A | * | 6/1997 | Labaze | 361/683 |
| 6,216,927 | B1 | * | 4/2001 | Meritt | 224/275 |
| 6,250,967 | B1 | * | 6/2001 | Chu | 439/668 |

FOREIGN PATENT DOCUMENTS

| | | | | |
|---|---|---|---|---|
| GB | 2215198 | * | 9/1989 | 297/229 |
| GB | 2264438 | * | 9/1993 | 297/220 |

* cited by examiner

Primary Examiner—Peter R. Brown
(74) Attorney, Agent, or Firm—Birch, Stewart, Kolasch & Birch, LLP (57) ABSTRACT

The present invention discloses a car headrest cover with protective and beatifying features, which is primarily used for a car headrest having a video device. By means of an accommodating space on the car headrest, a video device having a viewing window is installed on the car headrest at a position corresponding to the headrest cover. A protective unit is disposed on the headrest cover corresponding to the position of the viewing window, and a beatifying unit is disposed at the external surface of the protective unit. The foregoing components constitute a car headrest cover for protecting a video device, which has the dustproof, sun block, and anti theft features, and the beatifying unit with animal or doll styles can further adds an artistic effect to its appearance.

14 Claims, 10 Drawing Sheets

CAR HEADREST COVER FOR PROTECTING AND BEAUTIFYING HEADREST

FIELD OF THE INVENTION

The present invention relates to a car headrest cover, more particularly to a car headrest cover mounted onto a car headrest having a video device.

BACKGROUND OF THE INVENTION

Since the blooming of multimedia technology has integrated many things for our daily life, it makes our life more exciting and colorful, particularly after a mobile video device is installed in a car, the car no longer just serves as a means of transportation, but also provides us with traffic information through the video device to avoid traffic jams. Children can watch their favorite movies or play electronic games during a long-distance drive. By means of integrating a video device with a digital camera or camcorder, we can view the beautiful scenery we just shot. Therefore, the mobile video device gradually becomes one of the necessary and indispensable equipments to cars. At present, the position for installing a mobile video device in a car is nothing beyond the position above the stereo designated for the viewing by the driver and the front-seat passenger, and at the position of the headrest of the front seat for the viewing by the back-seat passengers. If the video device is installed at the position of the stereo, the video device can be combined with the meter panel and stereo of the car. Since the installation of the foregoing devices is located at the central position of the car, it gives better sun block and burglarproof effects. If the video device is installed onto the headrest at the front seat, the video device is generally embedded into the headrest. Since the installation points are on both sides of the car, the screen of the video device is under direct sunlight at a certain angle of the sunshine. The exposure under the sunlight over a long period of time will usually shorten the life of the video device. Therefore, most people install a curtain on the window at the back seat to have the sun block effect. However, so doing will ruin the overall stylish appearance of the car. Furthermore, children usually sit in the back seats, and the curtain cannot be drawn directly. Therefore, such arrangement is inappropriate. Furthermore, since the screen of the video device is exposed outside, it will accumulate dusts easily, and the screen is made of materials that are not easy to clean. If a wrong cleaning tool is used, it will abrade the screen. When the passenger of the back seat enters the car, the keys hanging at the waist or the buckle of the leather belt may accidentally scrape the monitor, which will damage or make the screen dirty. In addition, since the headrest usually has two rods inserted into the seat for its installation, and generally has some sort of appropriate burglarproof measures, it is still insufficient compared with the aforementioned stereo and mobile video device. The mobile video device is quite expensive, and definitely a target to thieves. The burglarproof function provided by the headrest is very poor, and thieves can steal the video device easily. A thief usually breaks the car window and directly removes the video device. No matter if a thief can or cannot steal the video device, it is unavoidable to have the window broken. Therefore, it is a subject for headrest cover manufacturers to invent a structure that can deceive with good intention to avoid being a target to thieves and also can have the dust-proof, sun block, and artistic effects.

SUMMARY OF THE INVENTION

The primary objective of the present invention is to overcome the above deficiencies and avoid the existing shortcomings by providing a headrest cover in accordance with the present invention, which comprises an accommodating space in the headrest of a car, a viewing window disposed at a position corresponding to the video device installed in the headrest, a protective unit disposed at a position corresponding to the viewing window of the headrest, and a beatifying unit disposed on the external surface of the protective unit, such that when the video device is not in use, we just need to cover the protective unit to protect the video device with the dust-proof and sun block effects, and avoid being a target of thieves. The animal or doll stylish beatifying unit provides an artistic look before viewing the video device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The detailed information and technical features of the present invention will be described with reference to the accompanying drawings below.

Figure 1:
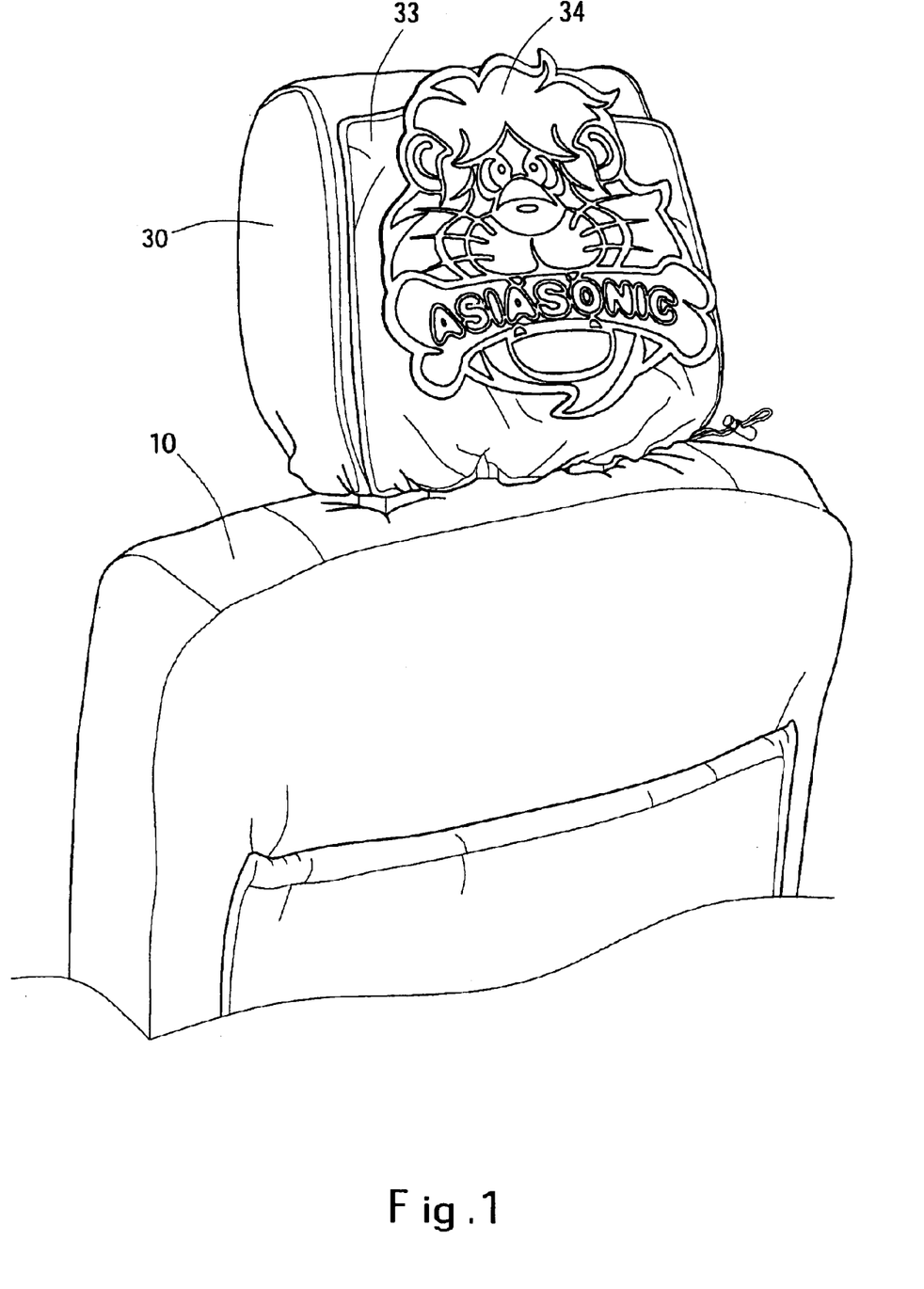
FIG. 1 is a perspective diagram of the car headrest cover according to the present invention being installed onto a car seat.
Figure 2:
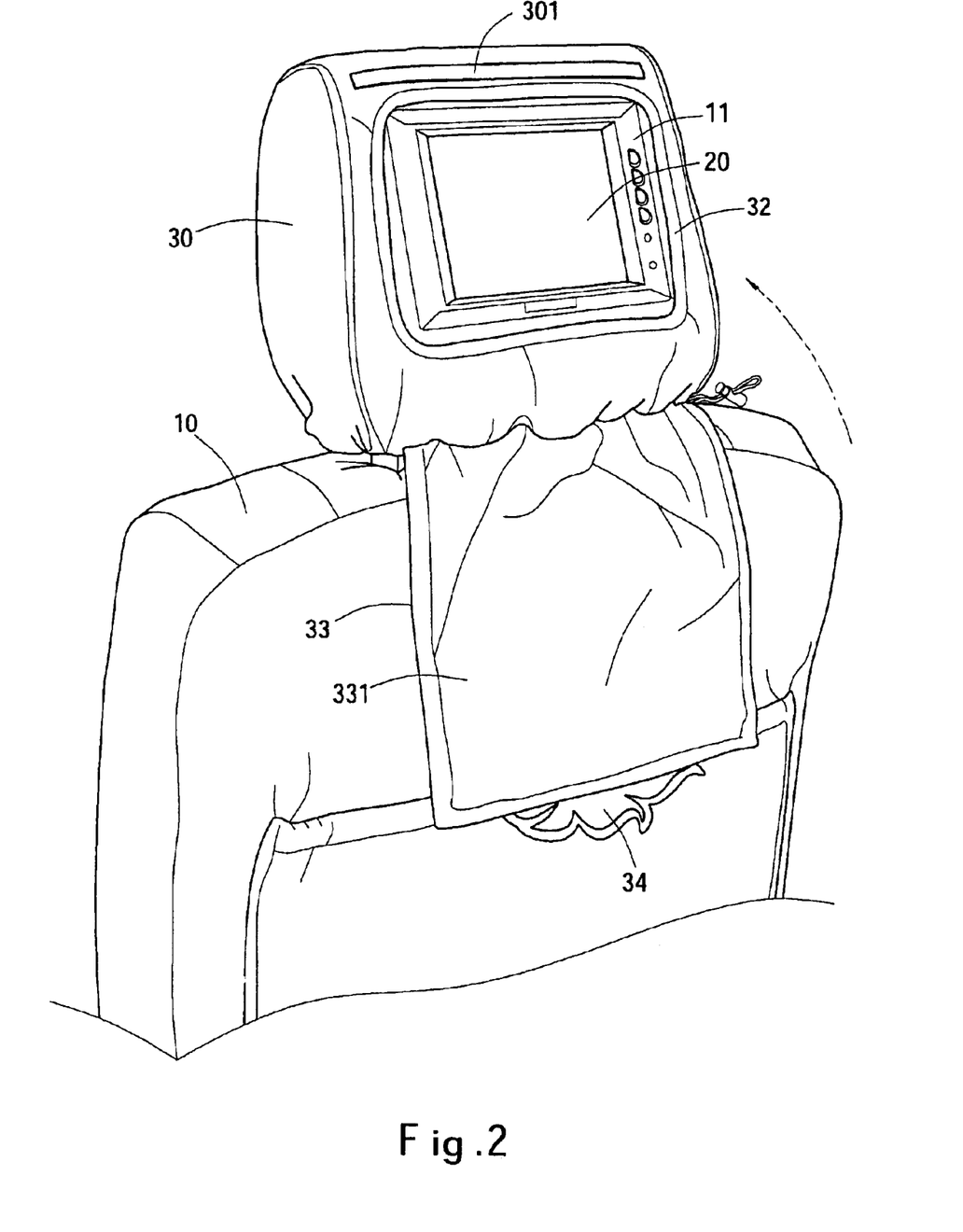
FIG. 2 is an illustrative diagram of the protective unit of the present invention as shown in FIG. 1.
Figure 3:
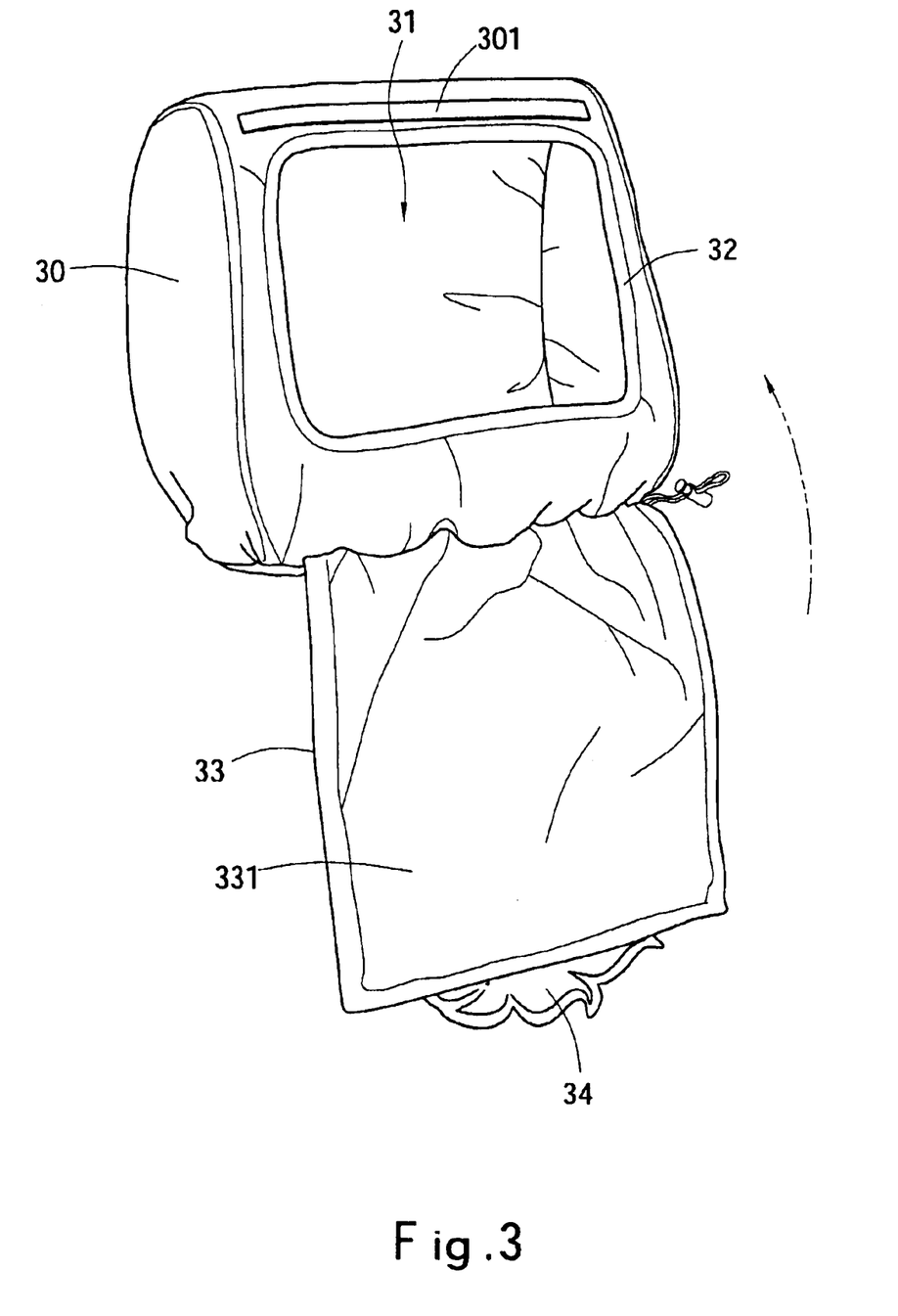
FIG. 3 is a perspective diagram of the appearance of the present invention.

Referring to FIGS. 1, 2, and 3, show the present invention having a video device 20 installed onto a car headrest 11, and a seat 10 is the front seat 10 of a car. The headrest cover 30 of the present invention comprises an accommodating space 31 for covering the car headrest 11; a video device 20 having a viewing window 32 and being installed to the headrest cover 30 at a position corresponding to the car headrest 11; a protective unit 33 disposed on the headrest 30 at a position corresponding to the viewing window 32; and a beatifying unit 34 disposed on the surface of the protective unit 33.

Figure 4:
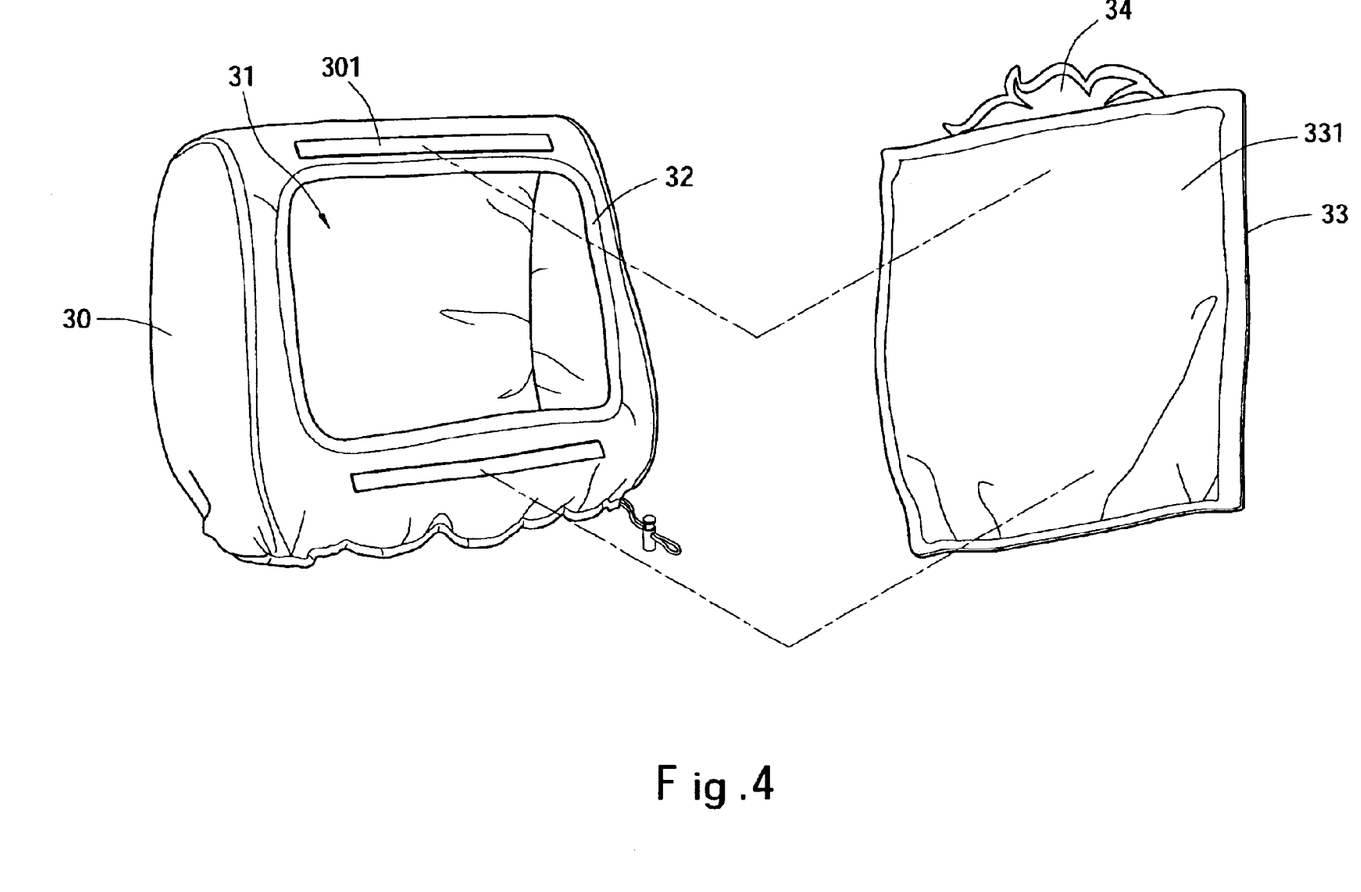
FIG. 4 is an illustrative diagram of the second preferred embodiment of the present invention.
Figure 5:
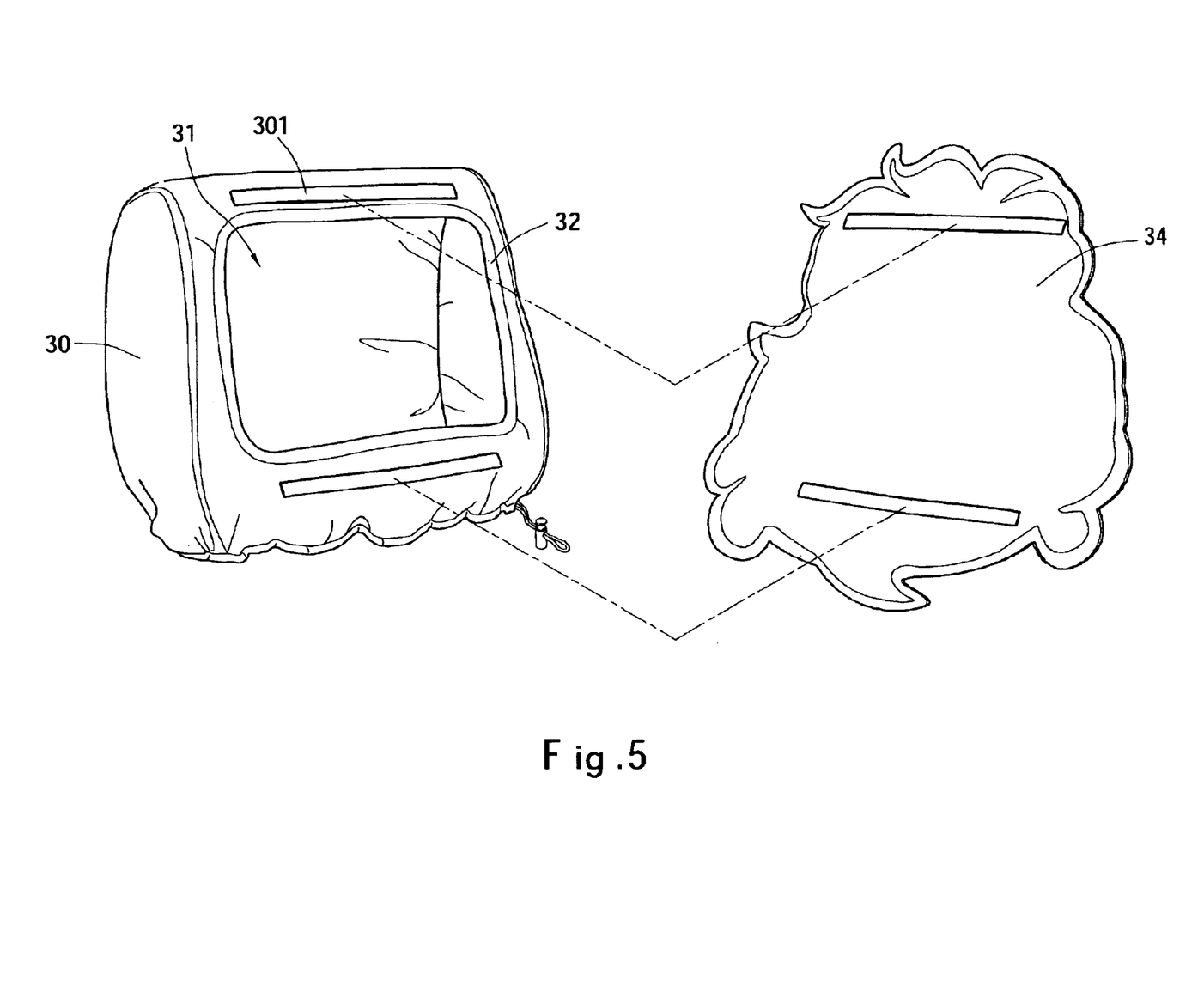
FIG. 5 is an illustrative diagram of the third preferred embodiment of the present invention.
Figure 7:
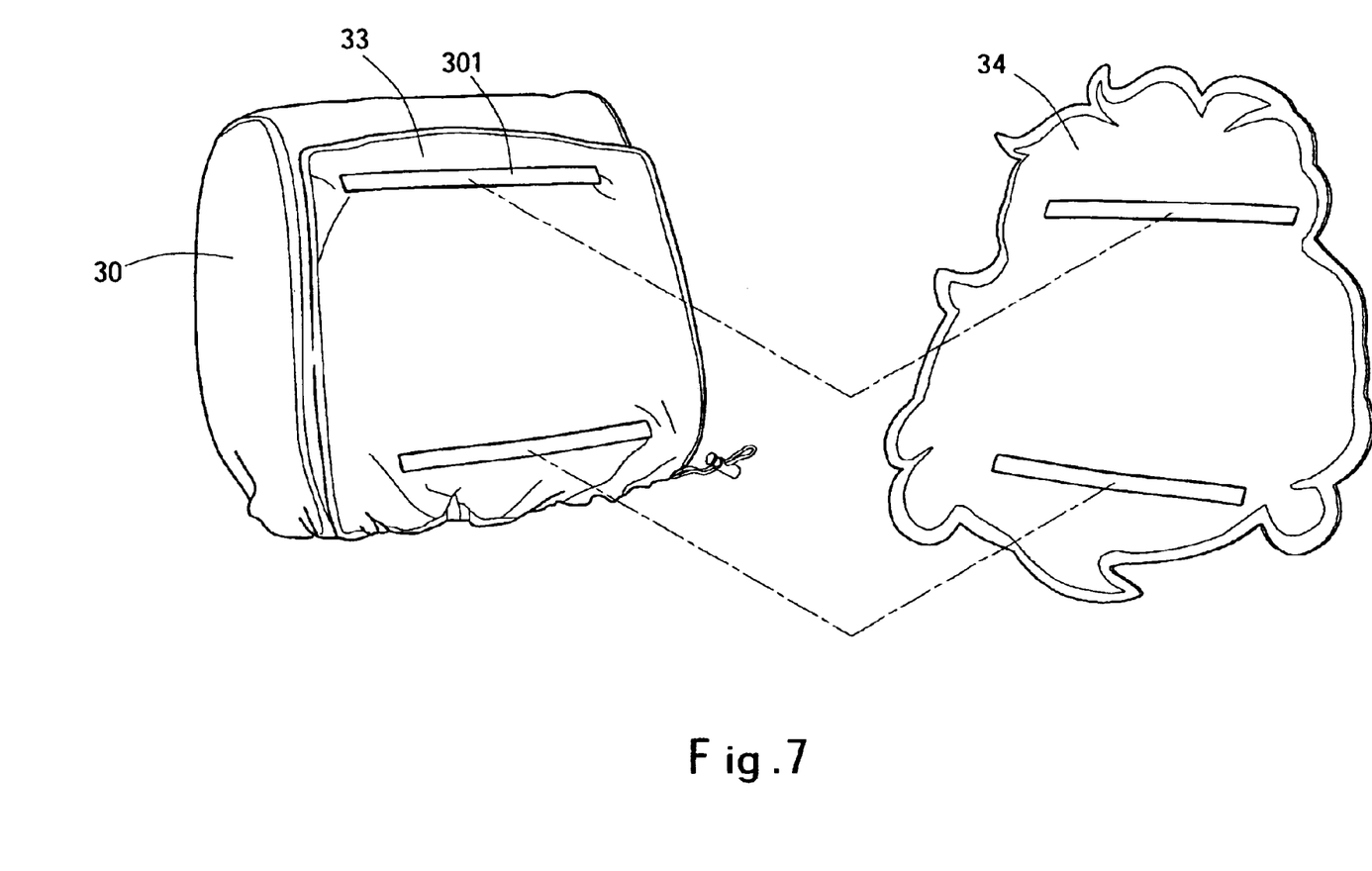
FIG. 7 is an illustrative diagram of the fourth preferred embodiment of the present invention.

When the protective unit 33 covers the video device 20, the sunlight will not directly shine on the video device 20 to avoid the video device 20 from being shined under the sunlight, which will shorten its life. The protective unit 33 further prevents the video device 20 from being exposed. Therefore, it can effectively prevent dust or foreign substances from entering and scraping the video device 20, particularly prevent the accident of being scraped by sharp objects at the waist of the people who enters the car. Further, the. protective unit 33 could be made of the same materials and the same color with those of the headrest cover 30. In addition, a regular car window generally has an insulated paper with certain thickness, and thus the inside of the car cannot be seen from the outside easily. Therefore, it is not easy to distinguish whether or not the car headrest cover 11 has installed a video device 20. Particularly, the protective unit 33 of the present invention installs an additional beatifying unit 34 with different doll styles onto the external surface of the protective unit 33. Such beatifying unit 34 is sewed onto the protective unit 33, or such beatifying unit 34 and the protective unit 33 are secured by adhesive latches as shown in FIG. 7, or the protective unit 33 is the doll being the beatifying unit 34 itself as shown in FIG. 5. If the passengers at the back seat can easily switch the protective unit 33 or the beatifying unit 34 of different doll styles, it adds flexibilities to the hardware in the car instead of just displaying the same monotonic screen on the video device 20. Furthermore, since this design and the low transparency of the insulated glass paper on the window can mislead thieves to make wrong judgment and think that the headrest 11 is only a doll stylish decoration and cancel the idea of stealing a video device 20. Using a beatifying unit 34 as the decoration also introduces the good-faith deceiving effect, which directly protects our car window from being broken by criminals and indirectly attains the anti theft purpose. When the passenger at the back seat operates the video device 20 for viewing a movie or playing a game, since one end of the protective unit 33 is sewed and fixed to the headrest cover 30, and the other end is fixed to a fixing component 301 on the headrest cover 30, and the internal surface of the protective unit 33 is an adhesive surface 331, such that the fixing component 301 and the adhesive side 331 can be adhered repeatedly with each other by adhesive tapes, and thus can easily release the protective unit downward by exerting a gentle force in order to view the program through the viewing window 32 on the video device 20. The way of fixing the protective unit 33 into the position as shown in FIG. 4 can be accomplished by setting the internal surface of the protective unit 33 as an adhesive surface 331, and both ends of the headrest 30 at a position corresponding to the protective unit 33 have a fixing component 301 for the adhesion and positioning.

Figure 6A:
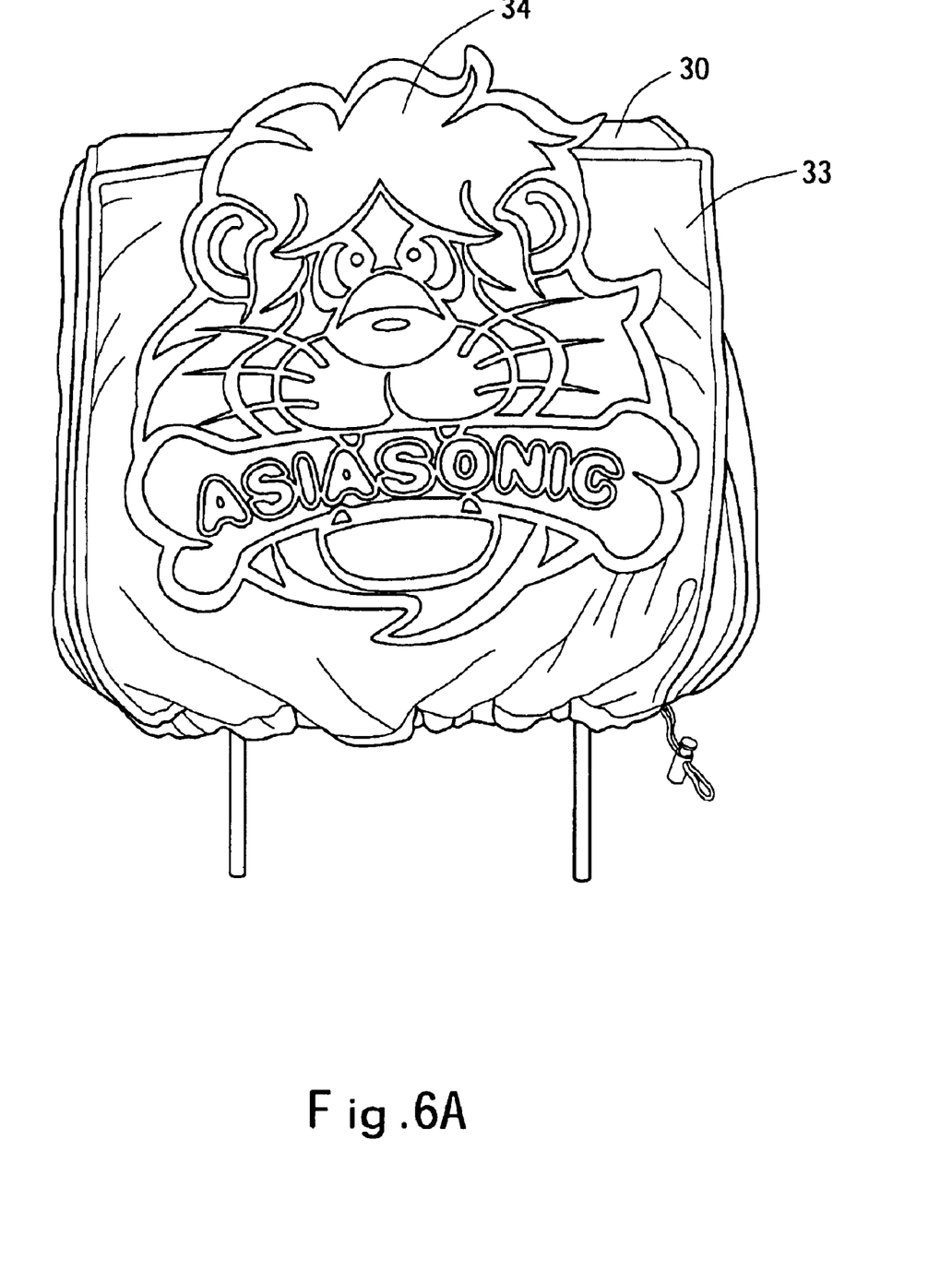
FIGS. 6A~6D are illustrative diagrams of the beatifying unit of different doll styles being installed to the present invention.
Figure 6B:
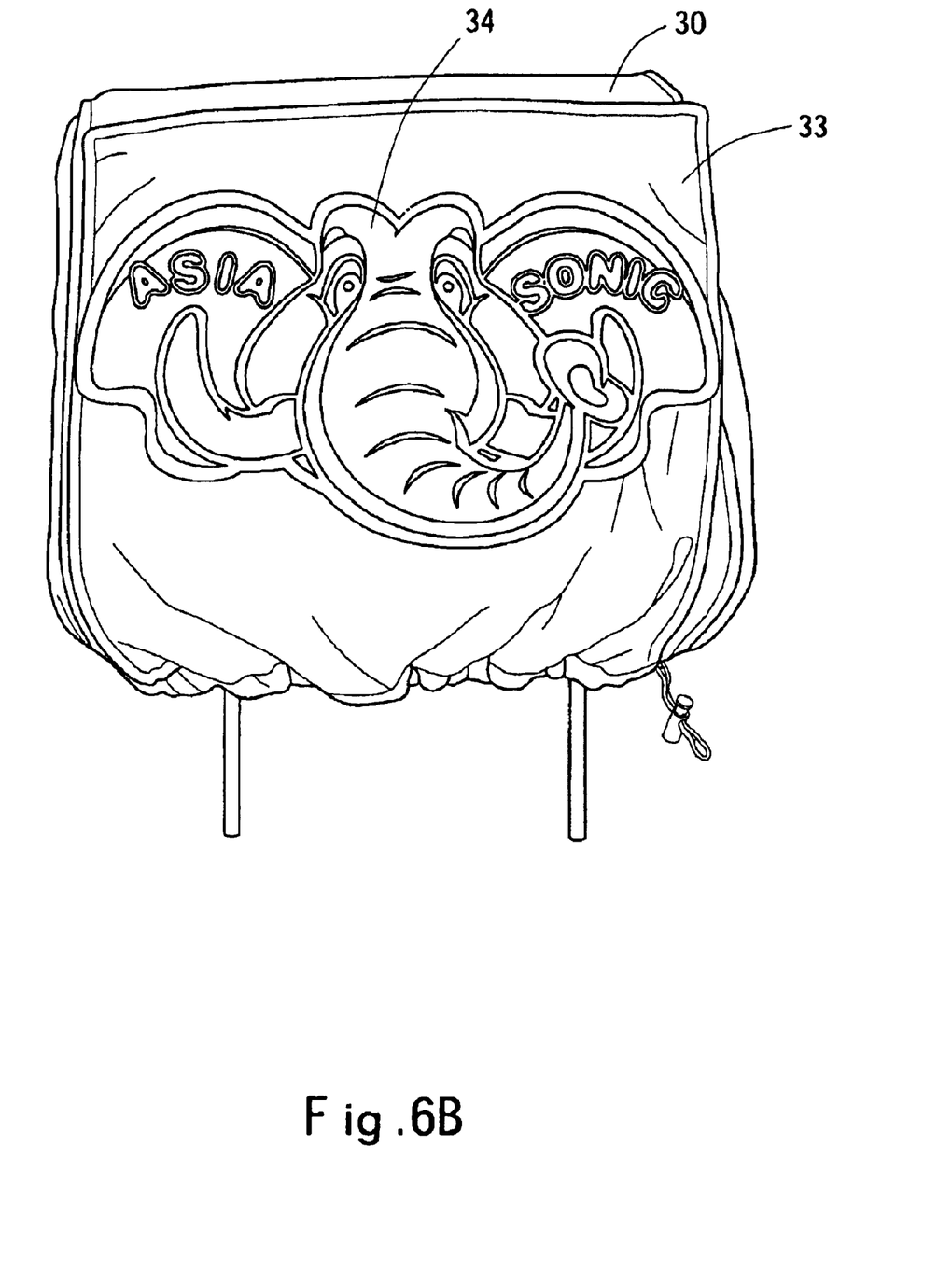
Figure 6C:
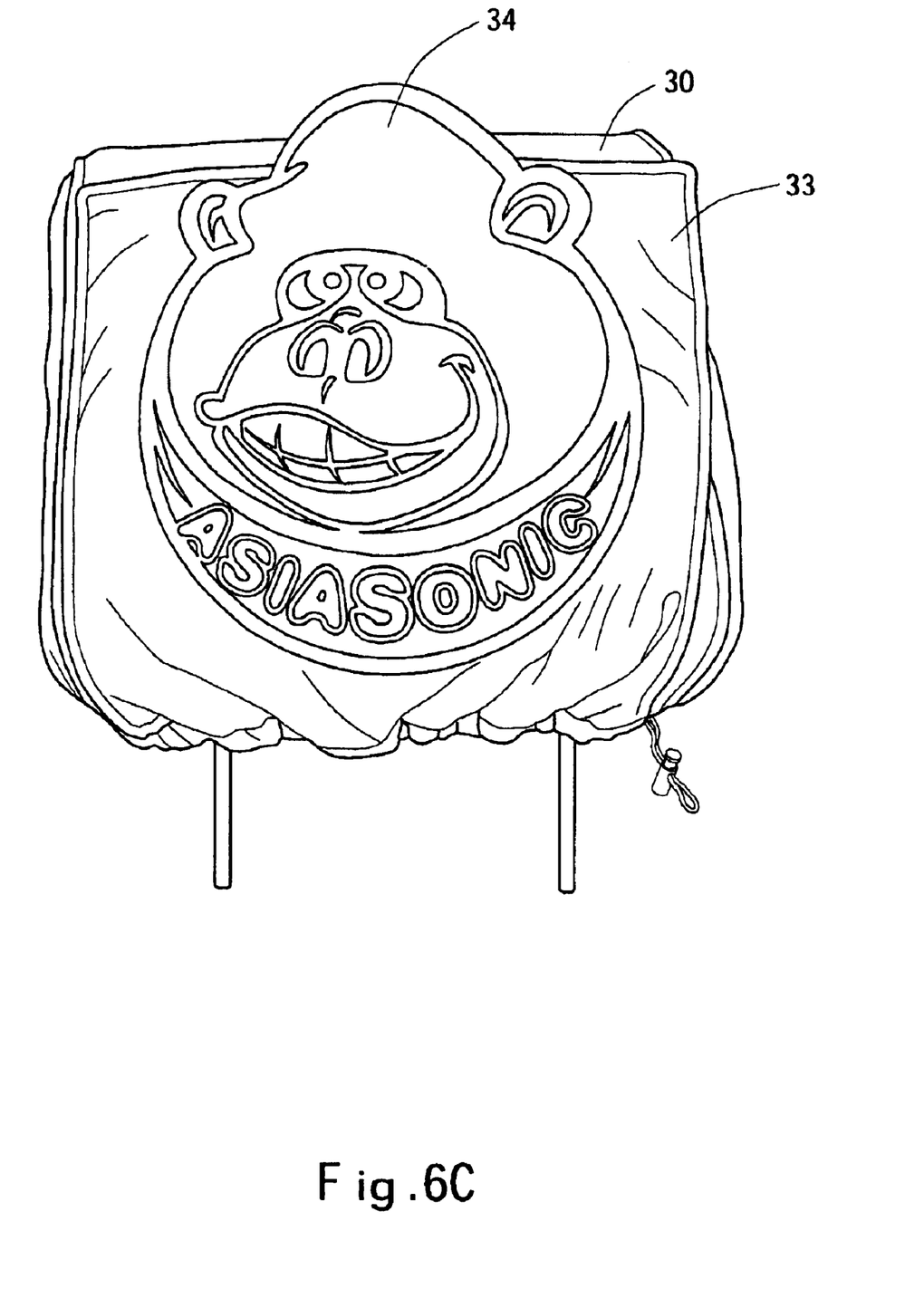
Figure 6D:
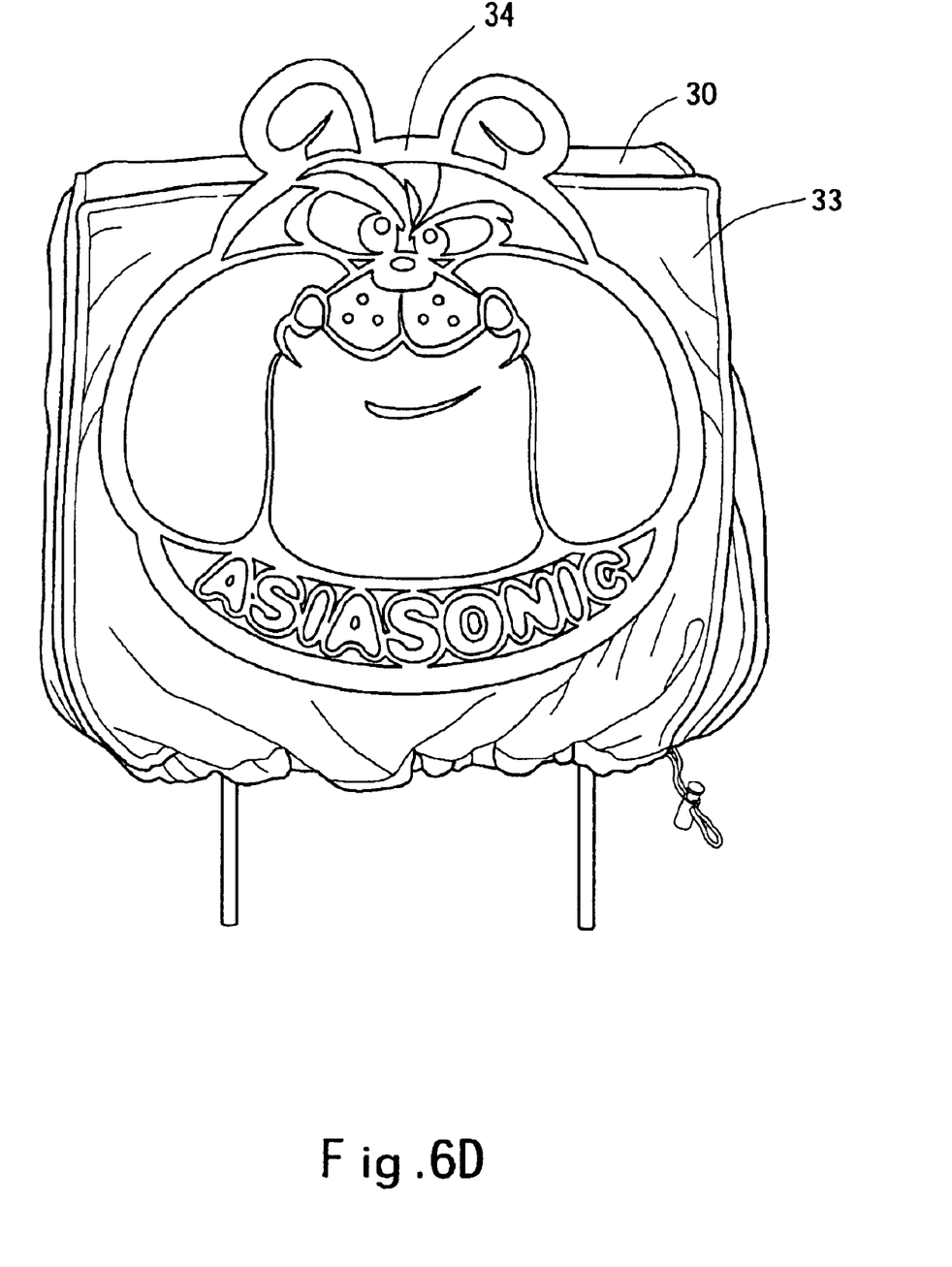

FIGS. 6A to 6D disclose the beatifying unit 34 in different stylish forms of dolls. For example, FIG. 6A shows a lion, FIG. 6B shows an elephant, FIG. 6C shows a gorilla, and FIG. 6D shows a dog. Of course, users may design the beatifying unit 34 in the form of any favorite landscapes or English words for education. The beatifying unit 34 is not limited to a plane or a three-dimensional design.

In view of the description above, the protective unit 33 and the beatifying unit 34 added to the headrest cover 30 according to the present invention can effectively attain the sun block and dust proof effects and have the anti theft function by indirectly deceiving the theft and prevent unnecessary damages to the car. Furthermore, the changeability of the beatifying unit 34 adds lively atmosphere to the car and allows the passengers at the back seat (particularly children) to have fun during the ride.

Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. A car headrest cover for protecting and beatifying a headrest and being covered on a headrest having a video device, wherein said headrest cover comprises an accommodating space disposed in said headrest, a viewing window disposed on said headrest cover corresponding to the position of said video device installed on said headrest, and a protective unit disposed on said headrest cover corresponding to the position of said viewing window, the headrest cover and the protective unit being readily detachable from the headrest.

2. The car headrest cover for protecting and beatifying a headrest of claim 1, wherein said protective unit has one end sewed and fixed to said headrest cover, and the other end has an adhesive surface for fixing by a fixing component disposed on said headrest cover and the internal surface of said protective unit.

3. The car headrest cover for protecting and beatifying a headrest of claim 2, wherein the headrest cover and protective unit match in color and materials to make it difficult to distinguish whether the car headrest cover has a video device.

4. The car headrest cover for protecting and beatifying a headrest of claim 1, wherein said protective unit on its internal surface has an adhesive surface, and a fixing component disposed on said headrest cover corresponding to both ends of said protective unit for their adhesion and positioning.

5. The car headrest cover for protecting and beatifying a headrest of claim 1, wherein said fixing component and adhesive surface are adhesive tape for repeated adhesions.

6. The car headrest cover for protecting and beatifying a headrest of claim 1, wherein said protective unit is a doll.

7. The car headrest cover for protecting and beatifying a headrest of claim 6, wherein the doll is readily detachable from the headrest cover.

8. The car headrest cover for protecting and beatifying a headrest of claim 1, wherein said protective unit has a beatifying unit on an external surface thereof.

9. The car headrest cover for protecting and beatifying a headrest of claim 8, wherein the beatifying unit is readily detachable from the protective unit.

10. The car headrest cover for protecting and beatifying a headrest of claim 1, wherein said beatifying unit is a doll of different styles.

11. The car headrest cover for protecting and beatifying a headrest of claim 1, wherein said beatifying unit is sewed and fixed onto said protective unit.

12. The car headrest cover for protecting and beatifying a headrest of claim 1, wherein said beatifying unit has at least one fixing component attachable to said protective unit for adhesion and positioning of the beatifying unit on the protective unit.

13. The car headrest cover for protecting and beatifying a headrest of claim 1, wherein the headrest cover and protective unit match in color and materials to make it difficult to distinguish whether the car headrest cover has a video device.

14. The car headrest cover for protecting and beatifying a headrest of claim 1, wherein the protective unit is pivotally attached to the headrest cover and wherein attachment means are provided for locking the protective unit in a closed position covering the viewing window.

* * * * *